US011442745B1

(12) United States Patent
Blackburn et al.

(10) Patent No.: US 11,442,745 B1
(45) Date of Patent: Sep. 13, 2022

(54) INTERCONNECTION DISCOVERY FOR AUTOMATED STANDARDS ASSAY

(71) Applicant: Wells Fargo Bank, N.A., San Francisco, CA (US)

(72) Inventors: Justin Christopher Blackburn, Gallatin Gateway, MT (US); Jeremy Daniel Blackburn, Tempe, AZ (US); Jacob Tyler Blackburn, Phoenix, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 140 days.

(21) Appl. No.: 16/721,866

(22) Filed: Dec. 19, 2019

(51) Int. Cl.
*G06F 8/61* (2018.01)
*G06F 9/445* (2018.01)

(52) U.S. Cl.
CPC .............. *G06F 9/4451* (2013.01); *G06F 8/61* (2013.01)

(58) Field of Classification Search
CPC .................................. G06F 9/4451; G06F 8/61
USPC ......................................................... 717/176
See application file for complete search history.

(56) References Cited

U.S. PATENT DOCUMENTS

| 7,546,383 | B2 | 6/2009 | Smith et al. |
| 7,760,746 | B2 | 7/2010 | Betts et al. |
| 8,285,844 | B2 | 10/2012 | Hussaini et al. |
| 9,977,617 | B2 | 5/2018 | Bolik et al. |
| 10,142,204 | B2 | 11/2018 | Nickolov et al. |
| 2005/0080811 | A1 | 4/2005 | Speeter et al. |
| 2005/0091227 | A1* | 4/2005 | McCollum et al. ...... G06F 8/71 |
| 2008/0098099 | A1* | 4/2008 | Khasnis et al. ........... G06F 8/61 709/222 |
| 2010/0217944 | A1 | 8/2010 | Dehaan et al. |
| 2014/0089474 | A1 | 3/2014 | Zenz et al. |
| 2015/0199188 | A1* | 7/2015 | Mantripragada et al. ................... G06F 8/61 717/101 |
| 2016/0357424 | A1 | 12/2016 | Pang et al. |
| 2016/0359678 | A1 | 12/2016 | Madani et al. |
| 2018/0069747 | A1* | 3/2018 | Kraus et al. ............ G06F 9/466 |
| 2018/0316562 | A1 | 11/2018 | Lepp et al. |

\* cited by examiner

*Primary Examiner* — Wei Y Zhen
*Assistant Examiner* — Mohammed N Huda
(74) *Attorney, Agent, or Firm* — Schwegman Lundberg & Woessner, P.A.

(57) ABSTRACT

Systems and techniques for interconnection discovery for automated standards assay are described herein. Configuration data may be obtained for a set of computing systems operating in the computing environment. The configuration data may be evaluated to identify a first application executing on a first computing system of the set of computing systems. First computing system configuration data may be obtained for the first computing system. The first computing system configuration data may be evaluated to identify a dependency of the first application. The dependency may be added to a first application dependency profile for the for first application.

18 Claims, 5 Drawing Sheets

INTERCONNECTION DISCOVERY FOR AUTOMATED STANDARDS ASSAY

TECHNICAL FIELD

Embodiments described herein generally relate to computer infrastructure management and, in some embodiments, more specifically to automatic discovery of interconnections is computing environments for standards assay.

BACKGROUND

An enterprise computing infrastructure may include many computing devices (e.g., hundreds, thousands, etc.). The infrastructure may have a variety of software applications executing on the computing devices that provide a variety of functions. Some of the software applications may provide similar functions. Configuration of a software application may vary from instance to instance. An administrator may desire to migrate an existing infrastructure to a new infrastructure environment. It may be desirable to determine a standard software application and corresponding configuration for a function to be provided in the new infrastructure to reduce complexity of the computing environment.

BRIEF DESCRIPTION OF THE DRAWINGS in the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
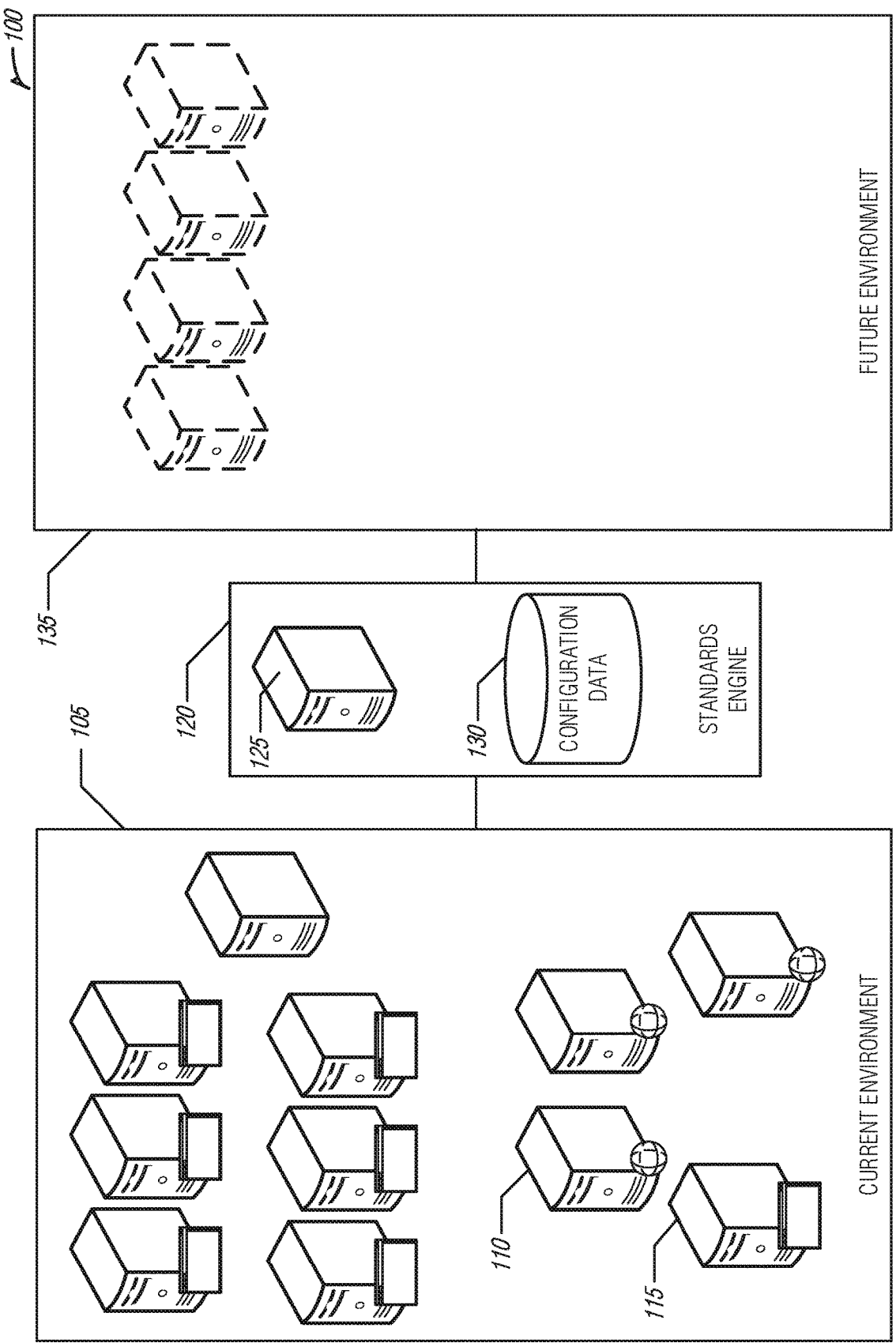
FIG. 1 is a block diagram of an example of an environment for interconnection discovery for automated standards assay, according to an embodiment.

An enterprise computing environment may include hundreds or thousands of applications running on a variety of computing systems throughout the computing environment. Various administrative teams may be responsible for implementing and supporting a function (e.g., a web-based product delivery function, a human resources computing system, an enterprise resource planning computing system, etc.) provided by the computing environment. Each administrative team may have a collection of applications used by its respective function and with which members of the administrative team may be familiar. As each administrative team implements applications from the collection, the complexity of the computing environment grows. Without a definition of computing standards (e.g., software application standards, computing hardware standards, etc.), the complexity of the environment may become unmanageable. For example, the vast array of various software applications may create security vulnerabilities because software updates and security patches may be missed.

The problem of a non-standardized computing environment may be highlighted in preparation for a migration from an existing computing environment to a new computing environment. Each function of the computing environment may need to be reestablished in the new computing environment. A non-standardized environment may be more costly and time consuming to migrate because of the vast variety of applications and configurations that may need to be recreated in the new computing environment.

For example, several business unit silos may each manage its own servers and middleware. Each may have set its own standards causing multiple different configuration options, file locations, and compliance scanning issues. An enterprise computing environment may include 250,000 middleware servers and the accompanying administrative staff. The servers may have hundreds of configuration options spread across dozens of files for each individual possible software package that may be installed. Traditional inventories may capture a small fraction of this information.

To address the problem of non-standard computing environments, the entirety of the server configuration is scanned for middleware including all of the configuration files and places them into a big data processing platform (e.g., APACHE HADOOP®, etc.). Data may be collected for multiple different middleware applications so that configurations for various platforms that provide a feature may be compared. For example, configurations for web server applications such as APACHE® HTTP Server, APACHE TOMCAT® Application Server, IBM® HTTP Server, IBM® WebSphere, and ORACLE® WEBLOGIC® to determine where each is installed. The data is analyzed using artificial intelligence (AI) to determine where software is installed and to identify interconnections between servers. The analysis may functionally look at how the enterprise is structured and may identify on an item by item basis a standard configuration. Many items such as proxy or database configurations may be used by multiple middleware applications and may be standardized across multiple seemingly unrelated software applications. For example, files with like functions may be placed in the same location for different software applications. The determined standards may be used as inputs for automated systems for reconfiguring the existing computing environment and for migrating the existing computing environment to a new standardized computing environment. This may assist in compliance efforts to keep the computing environment secure. The systems and techniques may be applied universally across industries and may be used in conjunction with a variety of computing system administration tools (e.g., orchestration, security, performance management, development, etc.) for evaluating massive computing environments to develop standards.

FIG. 1 is a block diagram of an example of an environment 100 for interconnection discovery for automated standards assay, according to an embodiment. The environment 100 may include an existing computing environment 105 (e.g., brownfield, etc.) and a new computing environment 135 (e.g., greenfield, etc.). A standards engine 120 may collect data from the existing computing environment 120 that may be used in the creation of computing systems in the new computing environment 135.

The existing computing environment 105 may include a variety of systems including webservers 110 and application servers 115. Each of the computing systems may execute a variety of software applications such as middleware. The standards engine 120 may include one or more scanning servers 125 that collect configuration data from the computing systems and store the configuration data in a configuration database 130. In an example, the configuration database 130 may be structured, unstructured, and in other formats that may be suitable for effective analysis of big datasets.

In an example, the existing computing environment 105 may include several applications that provide web server functionality to computing systems in the existing computing environment 105. In another example, the existing computing environment 105 may include several applications that provide database server functionality to computing systems in the existing computing environment 105. Each instance (e.g., each executing instantiation of an application, etc.) may have a configuration. The configuration may include a variety of configuration items such as, installation location, configuration file location, configuration files, configuration settings (e.g., as defined in the configuration files, operating system registry, etc.), etc. For example, the configuration may include a heap size, port numbers, installation directory, modules used, option flags, and the like.

The scanning servers 125 may scan the existing computing environment 105 to collect the configuration data from the computing systems operating in the existing computing environment 105. The configuration data may be stored in the configuration database 130. Artificial intelligence, machine learning, and deep learning techniques may be used to analyze the configuration data to identify standard configurations. The standard configurations may be used to reconfigure the existing computing environment 105 and may be used to orchestrate creation of computing systems in the new computing environment 135.

Figure 2:
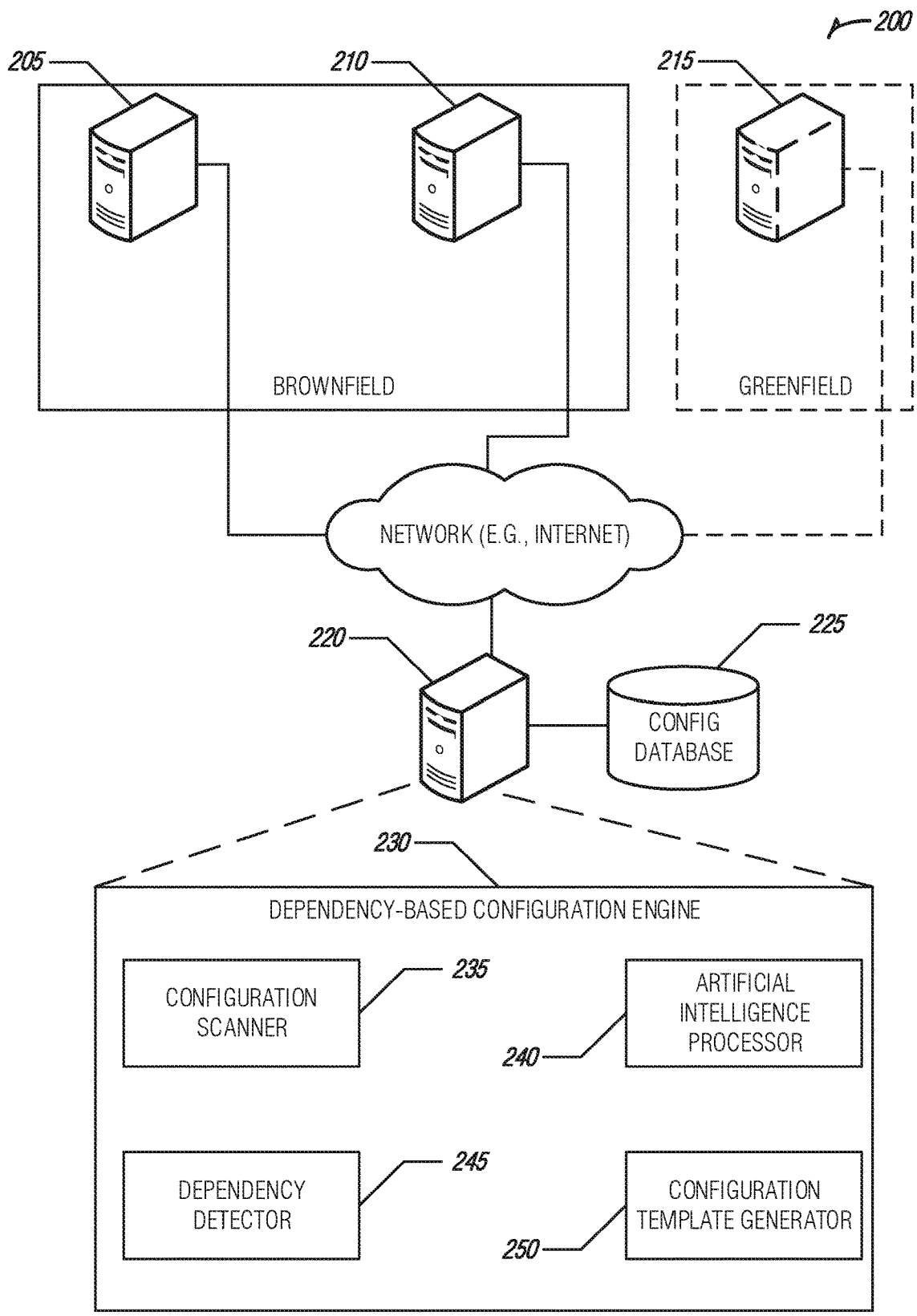
FIG. 2 is a block diagram of an example of an environment and a system for interconnection discovery for automated standards assay, according to an embodiment.

FIG. 2 is a block diagram of an example of an environment 200 and a system 230 for interconnection discovery for automated standards assay, according to an embodiment. The environment 200 may include a first computing system 205 and one or more other computing systems 210 that operate in an existing computing environment (e.g., a brownfield computing environment, etc.) that may be communicatively coupled (e.g., via wired network, wireless network, cellular network, the internet, etc.) to a configuration management server 220 (e.g., standalone server, server cluster, cloud-based service, virtual server, field programmable gate array (FPGA), application specific integrated circuit (ASIC), etc.). The configuration management server 220 may be communicatively coupled to a configuration database 225. The configuration management server 220 may include (e.g., operating as software implemented in computer-readable memory, etc.) the system 230. In an example, the system may be a dependency-based configuration engine. The system 230 may include a variety of components such as, a configuration scanner 235, an artificial intelligence processor 240, a dependency detector 245, and a configuration template generator 250.

The configuration scanner 235 may obtain configuration data for a set of computing systems operating in the existing computing environment. The configuration scanner 235 may scan computing systems (e.g., the first computing system 205, the other computing systems 210, etc.) to identify applications executing thereon. For example, the configuration scanner may use agent-based or agentless data collection techniques to inventory each of the computing systems to identify the applications. The configuration scanner 235 may collect configurations of the computing systems to determine parameters for the various instances of existing software applications executing on the computing systems. The parameters may include a variety of settings for the existing software application such as, installation directory, port numbers, heap sizes, configuration file locations, version information, database connections, and the like. The configuration scanner 220 may store the configuration data in the configuration database 225.

An enterprise may migrate a computing infrastructure from an existing computing environment to a new computing environment by installing new computing systems such as new computing system 215. The new computing environment may be built using standards-based configuration templates that have been derived from evaluation of configuration data collected by the configuration scanner 235 from the existing computing environment. The configuration templates may provide instructions for an application or system deployment system for configuring an application or system. The template may include a variety of configuration parameters such as configuration options, component modules, directories, etc. The use of standardized configuration templates may lead to streamlined administration including reduced system downtime, reduced system complexity, and reduced operating costs. The computing systems operating in the existing computing environment may execute a large number of applications. The applications may include a number of dependencies including other applications used by the existing software application and interconnections between the application and other computing systems. For example, an accounting application executing on the first computing system 205 may connect to a database application execution on one of the other computing systems 210. The accounting application may connect to a tax application that may be executing on the first computing system 205 or one of the other computing systems 210. Dependencies must be addressed to facilitate automatic migration of existing systems to the standards-based new computing environment.

The artificial intelligence processor 240 may evaluate the configuration data to identify a first application executing on the first computing system 205 of the set of computing systems. For example, the artificial intelligence processor 240 may use a variety of similarity matching techniques such as regression, classification, ranking, etc. to identify the first application. For example, a classification engine may be used to evaluate the configuration data to identity that an accounting application is executing on the first computing system 205. The artificial intelligence processor 240 may work in conjunction with the configuration scanner 235 to obtain first computing system configuration data for the first computing system 205. For example, the configuration data for the first computing system 205 may be obtained from the configuration database 225 or may be collected from the first computing system 205 by the configuration scanner 235.

The dependency detector 245 may work in conjunction with the artificial intelligence processor 240 to evaluate the first computing system configuration data to identify a dependency of the first application. In an example, the dependency is one of a reliance of the application on another application or an interconnection between the first application and a second computing system. For example, the artificial intelligence processor 240 may determine that the accounting system depends on a database connection to another computing system for data access and storage. In another example, it may be determined that the accounting system depends on a software library installed on the first computing system 205. The dependency detector 245 may add the dependency to a first application dependency profile for the for first application. The dependency profile may track universal dependencies for an application that are applicable to instances of the application. In an example, the dependency profile may track instance specific dependencies that may apply to one or more instances of the application. The dependency profile may be added to the configuration database 225 or may be stored in a dependency profile database (not shown).

The configuration template generator 250 may generate configuration templates that may be used in the installation of the application on new computing systems such as new computing system 215. In an example, the configuration data may be evaluated using the first application dependency profile to identify instances of the first application executing in the computing environment and a configuration template may be generated for the first application that includes a set of dependencies included in the first application dependency profile including the dependency. For example, a configuration template for the accounting application may include instructions to verify and install the software library and establish a connection to the other computing system the provides database access.

In another example, the configuration data may be evaluated to determine a set of dependencies for the first application. The set of dependencies may include a set of additional applications used by the first application and a set of interconnections between the first application and one or more other computing systems operating in the computing environment. A configuration template may be generated for the first application. The configuration template may include instructions to install the set of additional applications and reference pointers for one or more new computing systems that will provide functions of the one or more other computing systems in a new computing environment. In an example, the reference pointer may cause a configuration template to replace a resource with a new resource. For example, a database function may be consolidated so a configuration template for an application that currently accesses databased server DB-01 may include a reference pointer to a new database server DB-001, etc.

An enterprise computing environment may have accumulated unnecessary redundancy as the environment was modified over the course of operations. Thus, migration to a new computing environment may be an opportunity to reduce the unnecessary redundancy. In an example, a plurality of instances of the first application may be identified that include a set of uniform dependencies. A first configuration template may be generated for the first application that includes the set of uniform dependency. The plurality of instances of the first application may be reduced to a single instance of the first application upon completion of an installation of the first application in a new computing environment using the first configuration template. A reference pointer may be created in the configuration data for each instance of the plurality of instances that references the single instance of the first application. For example, multiple instances of a database application may be executing in the existing computing environment that may be capable of holding the accounting database. The instances may be reduced to one (perhaps more robust) instance of the database application and a reference pointer may be created for the accounting application that points to the single instance of the database application.

Standards may be determined for new computing environment based on an evaluation of configuration data for the existing computing environment. Some of the applications executing in the existing computing environment may not be standard applications but may provide functions similar to a standard application. Thus, configuration templates may be generated that convert a non-standard application instance to a standard application instance in the new computing environment. In an example, it may be determined that the first application provides a function equivalent to a standard application. A standard application configuration may be evaluated for the standard application. The dependency may be converted to a standard dependency based on the evaluation. The standard dependency may provide a feature of the dependency. A configuration template may be generated for a computing system to be installed in a new computing environment. The configuration template may include instructions for automated installation of the standard application with the standard dependency. For example, the accounting application may be non-standard, but a standard accounting application may be defined. The dependency of the database connection for the non-standard accounting supplication database connection may be converted to a standard accounting application database connection. For example, the configuration of the connection parameters, database field definitions, etc. may be included in the configuration template that are applicable to the standard accounting application database connection.

Configuration templates may be generated for standard applications based on configuration data of the existing computing environment. In an example, it may be determined that the first application is a standard application. The configuration data may be evaluated to determine a standard set of configuration values for the first application and a configuration template may be generated for the first application based on the standard set of configuration values.

Figure 3:
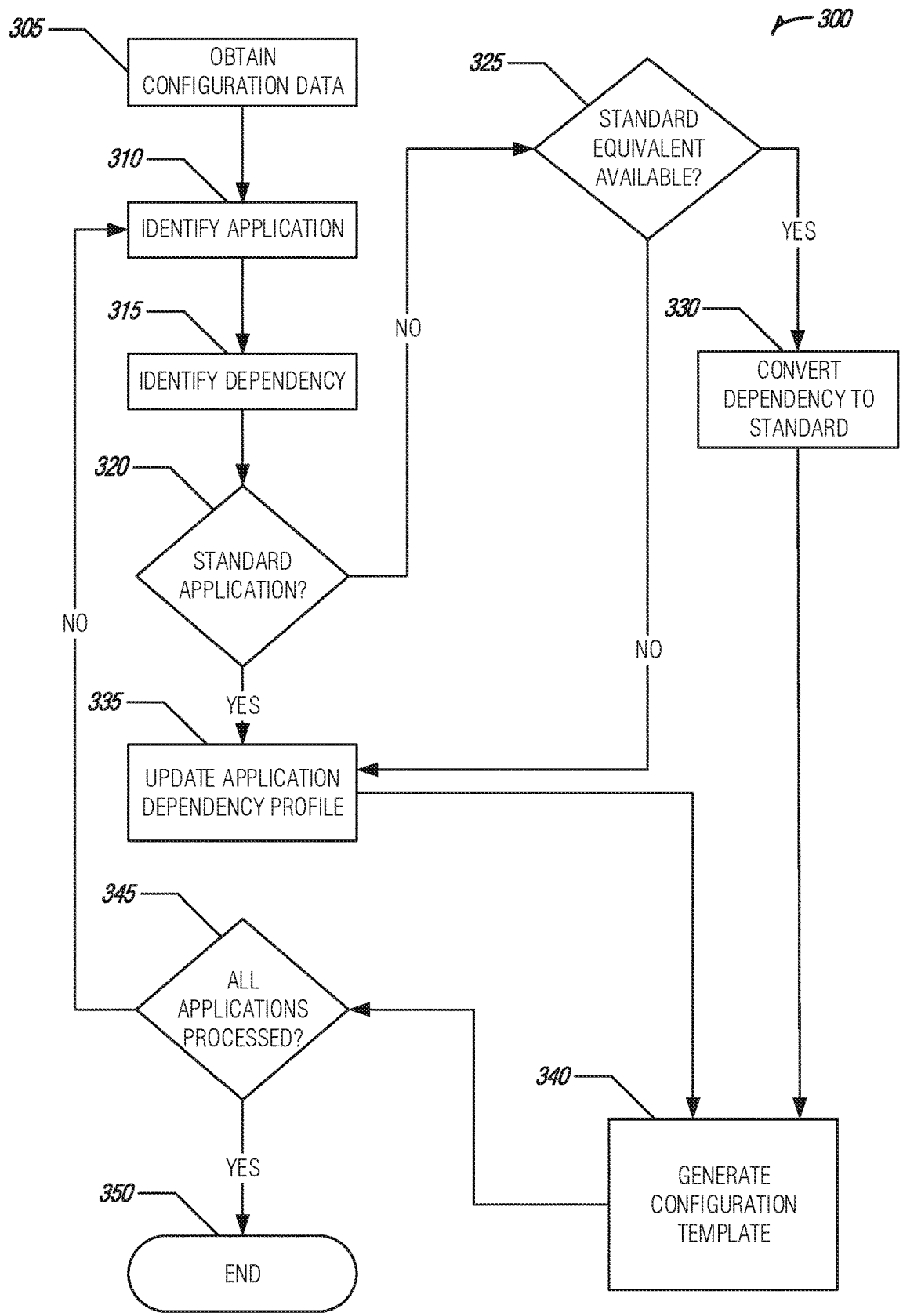
FIG. 3 illustrates an example of a process for interconnection discovery for automated standards assay, according to an embodiment.

FIG. 3 illustrates an example of a process 300 for interconnection discovery for automated standards assay, according to an embodiment. The process 300 may provide features as described in FIG. 2.

Configuration data may be obtained (e.g., by the configuration scanner 235 as described in FIG. 2, etc.) (e.g., at operation 305). An application may be identified (e.g., by the artificial intelligence processor 240 as described in FIG. 2, etc.) (e.g., at operation 310). A dependency of the application may be identified (e.g., by the dependency detector 245 as described in FIG. 2, etc.) (e.g., at operation 315). It may be determined (e.g., by the artificial intelligence processor 240 as described in FIG. 2, etc.) if the application is a standard application (e.g., at decision 320). If the application is not a standard application, it may be determined if there is a standard equivalent application available (e.g., at decision 325). Han equivalent standard application is available, the dependency may be converted to a standard application dependency (e.g., at operation 330).

If the application is determined to be a standard application (e.g., at decision 320) or it is determined that no standard equivalent is available (e.g., at decision 325), the application dependency profile for the application may be updated (e.g., at operation 335). The dependency (e.g., from operation 335) or the converted dependency (e.g., from operation 330) may be used to generate a configuration template for the application (e.g., at operation 340).

It may be determined if all of the applications present in the configuration data have been processed (e.g., at decision 345). If not, additional application may be similarly processed. When all applications have been processed, the process 300 ends (e.g., at end 350).

Figure 4:
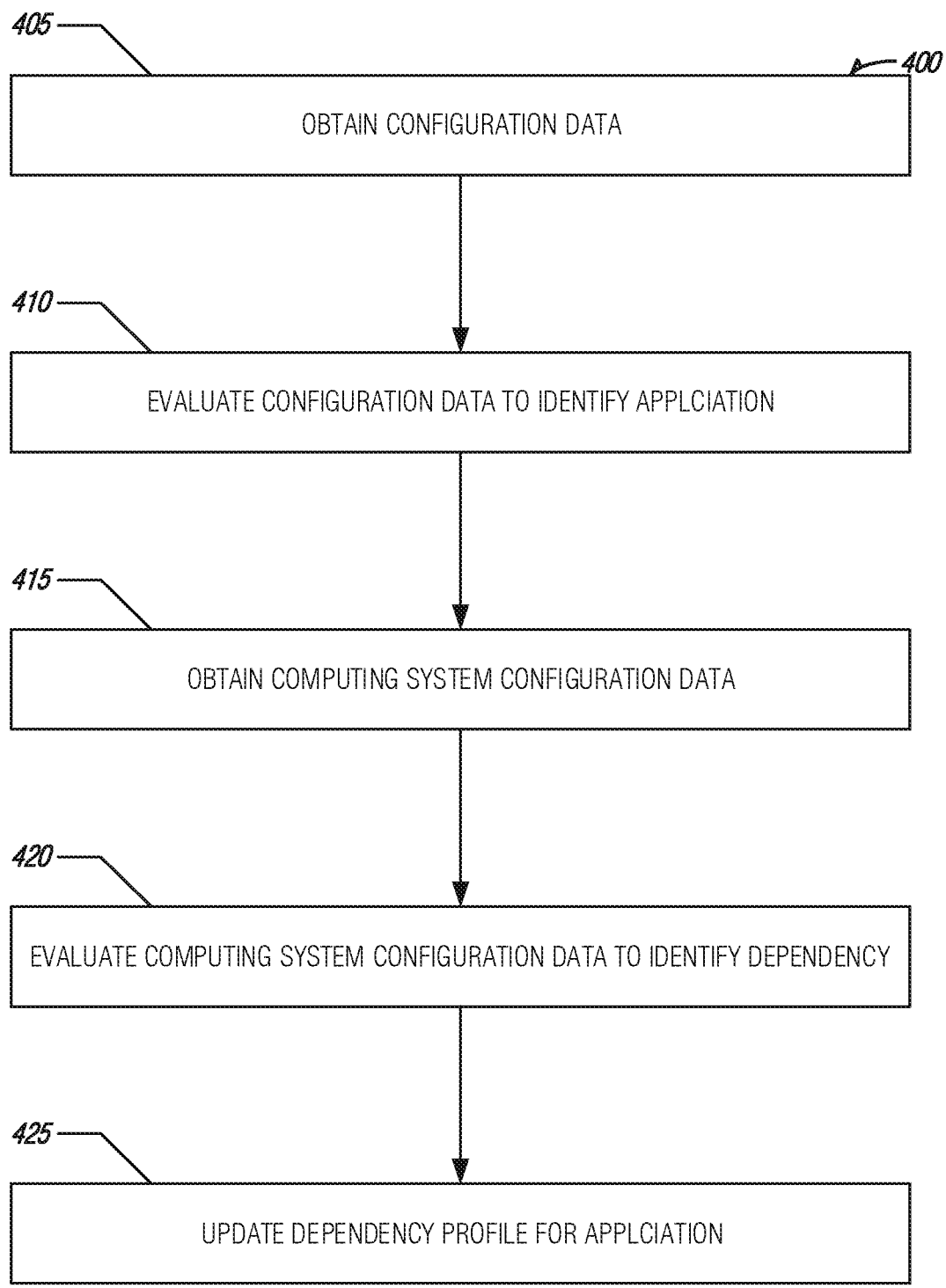
FIG. 4 is a flow diagram of an example of a method for interconnection discovery for automated standards assay, according to an embodiment.

FIG. 4 is a flow diagram of an example of a method 400 for interconnection discovery for automated standards assay, according to an embodiment. The method 400 may provide features as discussed in FIGS. 2 & 3.

Configuration data may be obtained (e.g., by the configuration scanner 235 as described in FIG. 2, etc.) for a set of computing systems operating in the computing environment (e.g., at operation 405).

The configuration data may be evaluated (e.g., by the artificial intelligence processor 240 as described in FIG. 2, etc.) to identify a first application executing on a first computing system of the set of computing systems (e.g., at operation 410).

First computing system configuration data may be obtained (e.g., by the configuration scanner 235 as described in FIG. 2, etc.) for the first computing system (e.g., at operation 415).

The first computing system configuration data may be evaluated (e.g., by the dependency detector 245 as described in FIG. 2, etc.) to identify a dependency of the first application (e.g., at operation 425). In an example, the dependency may be one of a reliance of the first application on another application or an interconnection between the first application and a second computing system.

The dependency may be added (e.g., by the dependency detector 245 as described in FIG. 2, etc.) to a first application dependency profile for the for first application (e.g., at operation 425). In another example, the configuration data may be evaluated using the first application dependency profile to identify instances of the first application executing in the computing environment and a configuration template may be generated for the first application that includes a set of dependencies included in the first application dependency profile including the dependency.

In another example, the configuration data may be evaluated to determine a set of dependencies for the first application. The set of dependencies may include a set of additional applications used by the first application and a set of interconnections between the first application and one or more other computing systems operating in the computing environment. A configuration template may be generated (e.g., by the configuration template generator 250 as described in FIG. 2, etc.) for the first application. The configuration template may include instructions to install the set of additional applications and reference pointers for one or more new computing systems that will provide functions of the one or more other computing systems in a new computing environment.

In an example, a plurality of instances of the first application may be identified that include a set of uniform dependencies. A first configuration template may be generated for the first application that includes the set of uniform dependency. The plurality of instances of the first application may be reduced to a single instance of the first application upon completion of an installation of the first application in a new computing environment using the first configuration template. A reference pointer may be created in the configuration data for each instance of the plurality of instances that references the single instance of the first application.

In an example, it may be determined that the first application is a standard application. The configuration data may be evaluated to determine a standard set of configuration values for the first application and a configuration template may be generated for the first application based on the standard set of configuration values.

In an example, it may be determined that the first application provides a function equivalent to a standard application. A standard application configuration may be evaluated for the standard application. The dependency may be converted to a standard dependency based on the evaluation. The standard dependency may provide a feature of the dependency. A configuration template may be generated for a computing system to be installed in a new computing environment. The configuration template may include instructions for automated installation of the standard application with the standard dependency.

Figure 5:
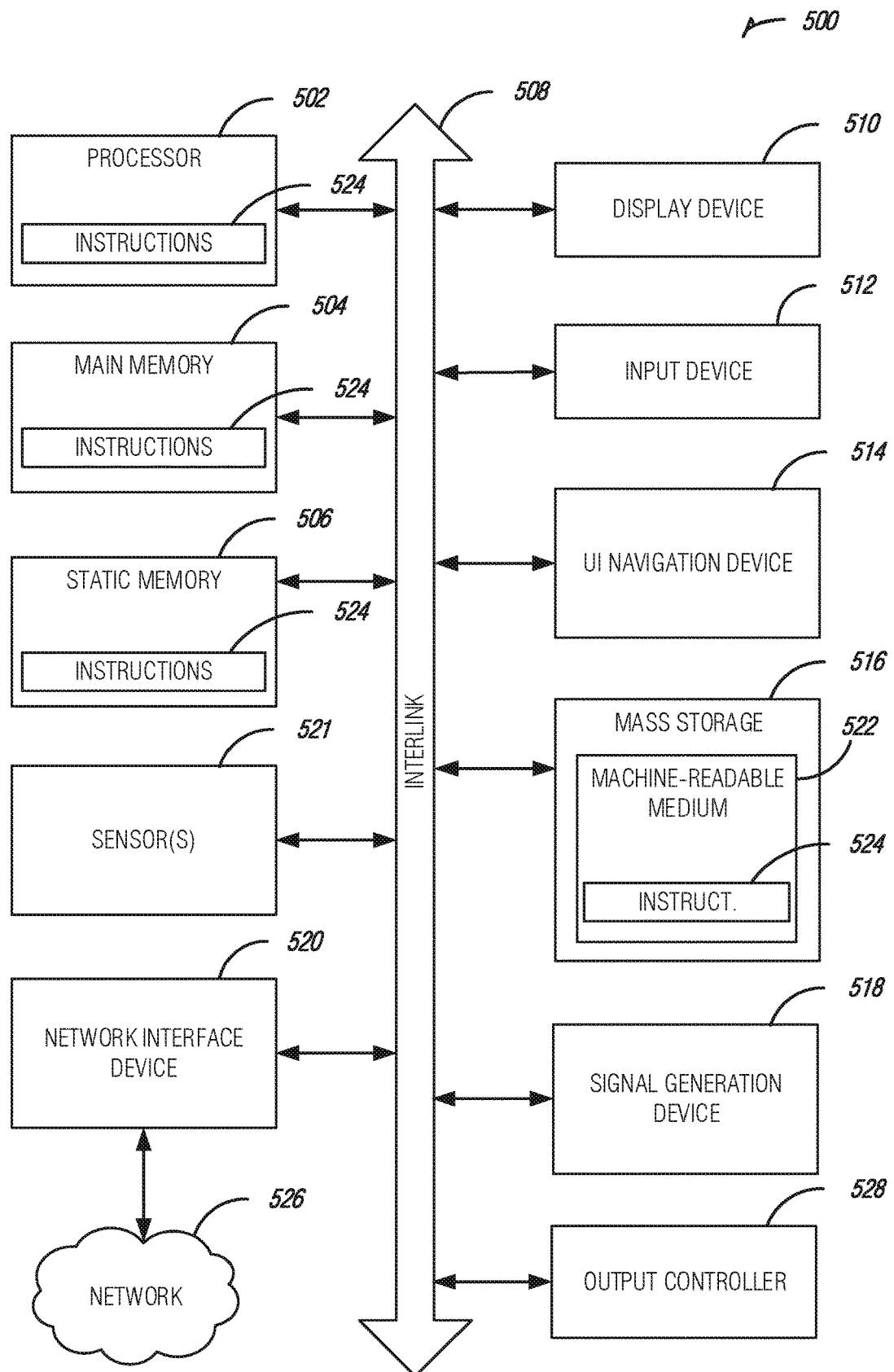
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old. Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for interconnection discovery in a computing environment, comprising:
at least one processor; and
memory including instructions that, when executed by the at least one processor, cause the at least one processor to perform operations to:
obtain configuration data for a set of computing systems operating in the computing environment;
evaluate the configuration data to identify a first application executing on a first computing system of the set of computing systems;
obtain first computing system configuration data for the first computing system;
evaluate the first computing system configuration data by inputting configuration files included in the first computing system configuration into an artificial intelligence model to produce output that identifies a dependency of the first application, wherein the dependency of the first application is identified as an interconnection between the first application and a second computing system, output by the artificial intelligence model, based on an evaluation of the configuration files by an artificial intelligence processor using the artificial intelligence model;
add the dependency to a first application dependency profile for the first application;
determine that the first application and a standard application provide at least one equivalent functional feature;
identify, from a standard application configuration for the standard application, a standard dependency that provides at least one feature of the dependency;
convert the dependency to the standard dependency; and
generate a configuration template for a computing system to be installed in a new computing environment, wherein the configuration template includes instructions for automated installation of the standard application with the standard dependency.

2. The system of claim 1, the memory further comprising instructions that, when executed by the at least one processor, cause the at least one processor to perform operations to identify an application dependency between the first application and another application output by the artificial intelligence model based on the evaluation of the configuration files by the artificial intelligence processor using the artificial intelligence model.

3. The system of claim 1, the memory further comprising instructions that cause the at least one processor to perform operations to:
evaluate the configuration data using the first application dependency profile to identify instances of the first application executing in the computing environment; and
generate a configuration template for the first application that includes a set of dependencies included in the first application dependency profile including the dependency.

4. The system of claim 1, the memory further comprising instructions that cause the at least one processor to perform operations to:
identify a plurality of instances of the first application that include a set of uniform dependencies;
generate a first configuration template for the first application that includes the set of uniform dependency;
reduce the plurality of instances of the first application to a single instance of the first application upon completion of an installation of the first application in a new computing environment using the first configuration template; and
create a reference pointer in the configuration data for each instance of the plurality of instances that references the single instance of the first application.

5. The system of claim 1, the memory further comprising instructions that cause the at least one processor to perform operations to:
determine that the first application is a standard application;
evaluate the configuration data to determine a standard set of configuration values for the first application; and
generate a configuration template for the first application based on the standard set of configuration values.

6. The system of claim 1, the memory further comprising instructions that cause the at least one processor to perform operations to:
evaluate the configuration data to determine a set of dependencies for the first application, wherein the set of dependencies includes a set of additional applications used by the first application and a set of interconnections between the first application and one or more other computing systems operating in the computing environment; and
generate a configuration template for the first application, wherein the configuration template includes instructions to install the set of additional applications and reference pointers for one or more new computing systems that will provide functions of the one or more other computing systems in a new computing environment.

7. At least one non-transitory machine-readable medium including instructions for interconnection discovery in a computing environment that, when executed by at least one processor, cause the at least one processor to perform operations to:
obtain configuration data for a set of computing systems operating in the computing environment;
evaluate the configuration data to identify a first application executing on a first computing system of the set of computing systems;
obtain first computing system configuration data for the first computing system;
evaluate the first computing system configuration data by inputting configuration files included in the first computing system configuration into an artificial intelligence model to produce output that identifies a dependency of the first application, wherein the dependency of the first application is identified as an interconnection between the first application and a second computing system, output by the artificial intelligence model, based on an evaluation of the configuration files by an artificial intelligence processor using the artificial intelligence model;

add the dependency to a first application dependency profile for the first application;

determine that the first application and a standard application provide at least one equivalent functional feature;

identify, from a standard application configuration for the standard application, a standard dependency that provides at least one feature of the dependency;

convert the dependency to the standard dependency; and generate a configuration template for a computing system to be installed in a new computing environment, wherein the configuration template includes instructions for automated installation of the standard application with the standard dependency.

8. The at least one non-transitory machine-readable medium of claim 7, further comprising instructions that, when executed by the at least one processor, cause the at least one processor to perform operations to identify an application dependency between the first application and another application output by the artificial intelligence model based on the evaluation of the configuration files by the artificial intelligence processor using the artificial intelligence model.

9. The at least one non-transitory machine-readable medium of claim 7, further comprising instructions that cause the at least one processor to perform operations to:

evaluate the configuration data using the first application dependency profile to identify instances of the first application executing in the computing environment; and generate a configuration template for the first application that includes a set of dependencies included in the first application dependency profile including the dependency.

10. The at least one non-transitory machine-readable medium of claim 7, further comprising instructions that cause the at least one processor to perform operations to:

identify a plurality of instances of the first application that include a set of uniform dependencies;

generate a first configuration template for the first application that includes the set of uniform dependency;

reduce the plurality of instances of the first application to a single instance of the first application upon completion of an installation of the first application in a new computing environment using the first configuration template; and create a reference pointer in the configuration data for each instance of the plurality of instances that references the single instance of the first application.

11. The at least one non-transitory machine-readable medium of claim 7, further comprising instructions that cause the at least one processor to perform operations to:

determine that the first application is a standard application;

evaluate the configuration data to determine a standard set of configuration values for the first application; and generate a configuration template for the first application based on the standard set of configuration values.

12. The at least one non-transitory machine-readable medium of claim 7, further comprising instructions that cause the at least one processor to perform operations to:

evaluate the configuration data to determine a set of dependencies for the first application, wherein the set of dependencies includes a set of additional applications used by the first application and a set of interconnections between the first application and one or more other computing systems operating in the computing environment; and generate a configuration template for the first application, wherein the configuration template includes instructions to install the set of additional applications and reference pointers for one or more new computing systems that will provide functions of the one or more other computing systems in a new computing environment.

13. A method for interconnection discovery in a computing environment, comprising:

obtaining configuration data for a set of computing systems operating in the computing environment;

evaluating the configuration data to identify a first application executing on a first computing system of the set of computing systems;

obtaining first computing system configuration data for the first computing system;

evaluating the first computing system configuration data by inputting configuration files included in the first computing system configuration into an artificial intelligence model to produce output that identifies a dependency of the first application, wherein the dependency of the first application is identified as an interconnection between the first application and a second computing system, output by the artificial intelligence model, based on an evaluation of the configuration files by an artificial intelligence processor using the artificial intelligence model;

adding the dependency to a first application dependency profile for the first application;

determining that the first application and a standard application provide at least one equivalent functional feature;

identifying, from a standard application configuration for the standard application, a standard dependency that provides at least one feature of the dependency;

converting the dependency to the standard dependency; and generating a configuration template for a computing system to be installed in a new computing environment, wherein the configuration template includes instructions for automated installation of the standard application with the standard dependency.

14. The method of claim 13, further comprising identifying an application dependency between the first application and another application output by the artificial intelligence model based on the evaluation of the configuration files by the artificial intelligence processor using the artificial intelligence model.

15. The method of claim 13, further comprising:

evaluating the configuration data using the first application dependency profile to identify instances of the first application executing in the computing environment; and generating a configuration template for the first application that includes a set of dependencies included in the first application dependency profile including the dependency.

16. The method of claim 13, further comprising:

identifying a plurality of instances of the first application that include a set of uniform dependencies;

generating a first configuration template for the first application that includes the set of uniform dependency;

reducing the plurality of instances of the first application to a single instance of the first application upon completion of an installation of the first application in a new computing environment using the first configuration template; and creating a reference pointer in the configuration data for each instance of the plurality of instances that references the single instance of the first application.

17. The method of claim 13, further comprising:

determining that the first application is a standard application;

evaluating the configuration data to determine a standard set of configuration values for the first application; and generating a configuration template for the first application based on the standard set of configuration values.

18. The method of claim 13, further comprising:

evaluating the configuration data to determine a set of dependencies for the first application, wherein the set of dependencies includes a set of additional applications used by the first application and a set of interconnections between the first application and one or more other computing systems operating in the computing environment; and generating a configuration template for the first application, wherein the configuration template includes instructions to install the set of additional applications and reference pointers for one or more new computing systems that will provide functions of the one or more other computing systems in a new computing environment.

* * * * *

UNITED STATES PATENT AND TRADEMARK OFFICE
CERTIFICATE OF CORRECTION

| | |
|---|---|
| PATENT NO. | : 11,442,745 B1 |
| APPLICATION NO. | : 16/721866 |
| DATED | : September 13, 2022 |
| INVENTOR(S) | : Blackburn et al. |

It is certified that error appears in the above-identified patent and that said Letters Patent is hereby corrected as shown below:

On the Title Page

In item (57), in "Abstract", in Column 2, Line 11, after "the", delete "for"

Signed and Sealed this
Twenty-seventh Day of December, 2022

*Katherine Kelly Vidal*
Katherine Kelly Vidal
*Director of the United States Patent and Trademark Office*